United States Patent
Nicolai et al.

(10) Patent No.: US 9,975,283 B2
(45) Date of Patent: *May 22, 2018

(54) METHOD FOR PRODUCING AT LEAST TWO-LAYER COMPONENTS, AND COMPONENT

(71) Applicant: HP Pelzer Holding GmbH, Witten (DE)

(72) Inventors: Norbert Nicolai, Schermbeck-Gahlen (DE); Reimund Piatkowski, Dortmund (DE); Hartmut Renken, Dülmen (DE); Klaus Krömer, Witten (DE); Volkmar Schulze, Schierling (DE)

(73) Assignee: HP Pelzer Holding GMBH (DE)

( * ) Notice: Subject to any disclaimer, the term of this patent is extended or adjusted under 35 U.S.C. 154(b) by 267 days.

This patent is subject to a terminal disclaimer.

(21) Appl. No.: 14/442,878

(22) PCT Filed: Nov. 15, 2013

(86) PCT No.: PCT/EP2013/073899
§ 371 (c)(1),
(2) Date: May 14, 2015

(87) PCT Pub. No.: WO2014/082869
PCT Pub. Date: Jun. 5, 2014

(65) Prior Publication Data
US 2015/0298369 A1  Oct. 22, 2015

(30) Foreign Application Priority Data
Nov. 30, 2012 (DE) .................. 10 2012 222 000

(51) Int. Cl.
| | | |
|---|---|---|
| B29C 44/06 | (2006.01) | |
| B29C 51/14 | (2006.01) | |
| B29C 44/10 | (2006.01) | |
| B29C 44/34 | (2006.01) | |
| B32B 5/02 | (2006.01) | |
| B32B 27/12 | (2006.01) | |
| B32B 27/20 | (2006.01) | |
| B29C 51/10 | (2006.01) | |
| B60R 13/08 | (2006.01) | |
| B60R 13/01 | (2006.01) | |
| B29K 311/10 | (2006.01) | |
| B29L 31/00 | (2006.01) | |
| B29L 31/30 | (2006.01) | |
| B29C 51/00 | (2006.01) | |
| B29K 23/00 | (2006.01) | |
| B29K 105/04 | (2006.01) | |
| B29K 105/16 | (2006.01) | |
| B29K 105/00 | (2006.01) | |
| B29K 475/00 | (2006.01) | |
| B29K 511/02 | (2006.01) | |
| B29L 9/00 | (2006.01) | |
| B29L 31/58 | (2006.01) | |

(52) U.S. Cl.
CPC ............ *B29C 44/06* (2013.01); *B29C 44/105* (2013.01); *B29C 44/3415* (2013.01); *B29C 44/3426* (2013.01); *B29C 51/14* (2013.01); *B32B 5/02* (2013.01); *B32B 5/024* (2013.01); *B32B 5/026* (2013.01); *B32B 27/12* (2013.01); *B32B 27/20* (2013.01); *B29C 51/002* (2013.01); *B29C 51/004* (2013.01); *B29C 51/10* (2013.01); *B29C 51/145* (2013.01); *B29C 2791/006* (2013.01); *B29C 2791/007* (2013.01); *B29K 2023/06* (2013.01); *B29K 2023/12* (2013.01); *B29K 2105/04* (2013.01); *B29K 2105/16* (2013.01); *B29K 2105/256* (2013.01); *B29K 2311/10* (2013.01); *B29K 2423/12* (2013.01); *B29K 2425/06* (2013.01); *B29K 2475/00* (2013.01); *B29K 2511/02* (2013.01); *B29K 2995/0015* (2013.01); *B29L 2009/00* (2013.01); *B29L 2031/3017* (2013.01); *B29L 2031/58* (2013.01); *B29L 2031/7138* (2013.01); *B32B 2262/0253* (2013.01); *B32B 2262/0276* (2013.01); *B32B 2605/003* (2013.01); *B32B 2605/08* (2013.01); *B60R 13/011* (2013.01); *B60R 13/0815* (2013.01)

(58) Field of Classification Search
None
See application file for complete search history.

(56) References Cited

U.S. PATENT DOCUMENTS

| | | | | |
|---|---|---|---|---|
| 5,759,324 A | * | 6/1998 | Roth | B29B 13/023 156/152 |
| 6,358,459 B1 | * | 3/2002 | Ziegler | B29C 67/205 264/102 |
| 9,702,141 B2 | * | 7/2017 | Nicolai | G10K 11/168 |
| 2003/0030188 A1 | | 2/2003 | Spengler | |

(Continued)

FOREIGN PATENT DOCUMENTS

| | | |
|---|---|---|
| DE | 39 05 607 A1 | 8/1990 |
| DE | 199 60 945 A1 | 6/2001 |

(Continued)

*Primary Examiner* — Monica Huson
(74) *Attorney, Agent, or Firm* — Seth L. Hudson; Clements Bernard Walker, PLLC

(57) ABSTRACT

The invention relates to a method for producing at least two-layer components and correspondingly produced components per se as absorptive lining in the interior and/or boot or for floor coverings of motor vehicles, comprising a top material and an absorber.

4 Claims, No Drawings

(56) References Cited

U.S. PATENT DOCUMENTS

| | | | |
|---|---|---|---|
| 2004/0180177 A1* | 9/2004 | Ray | B32B 5/02 |
| | | | 428/86 |
| 2006/0278322 A1* | 12/2006 | Piatkowski | B29C 35/049 |
| | | | 156/62.2 |
| 2007/0126275 A1 | 6/2007 | Peterson | |
| 2007/0126276 A1 | 6/2007 | Peterson | |

FOREIGN PATENT DOCUMENTS

| | | |
|---|---|---|
| DE | 103 60 427 A1 | 7/2005 |
| DE | 10 2004 046 201 A1 | 4/2006 |
| DE | 10 2007 036 952 A1 | 2/2009 |
| EP | 0 453 877 A1 | 10/1991 |
| JP | 6-31812 A | 2/1994 |
| JP | 1-24158 A | 1/1995 |
| JP | 7-24158 A | 1/1995 |
| JP | 2003-117992 A | 4/2003 |
| KR | 2003-0015155 A | 2/2003 |

\* cited by examiner

METHOD FOR PRODUCING AT LEAST TWO-LAYER COMPONENTS, AND COMPONENT

1) FIELD OF THE INVENTION

The invention relates to a method for producing at least two-layer components and correspondingly produced components per se as absorptive lining in the interior and/or trunk or for floor coverings of motor vehicles, comprising a top material and an absorber.

2) BACKGROUND

Trunk linings essentially consist of a surface material, especially of a textile or sheet fabric, and an absorber on the backside, which may also have supporting properties, as a stiffening non-woven, for example. A wide variety of materials are employed for the absorber, stiffening non-woven or pure support. Supports made of plastic, especially injection-molded supports, are laminated after molding, or the textile top material is back-injected with the support material. Another solution is represented by textile-coated plastic sheets that are prepared by extrusion-coating the plastic as a pure plastic, or filled with inorganic agents as well as different fibers, onto the textile, and subsequently forming by pressing.

One specific embodiment of the plastic is polyolefin foams, which are preformed and laminated. Alternatively, a textile surface may also be foam-coated.

Known absorbers, insulations compressed into a stiffening non-woven or support, include a wide variety of fibers (plastic and natural fibers), which are bonded with a bonding agent of thermoplastic or thermosetting nature in a blank production process, thermally of by needling, or in the subsequent processing. Known bonding agents include polypropylene, acrylates or resins of various nature, as well as bicomponent (BiCo) fibers, which essentially consist of a PET core and often a coPET coat.

The thermoplastic absorber and a textile surface material are heated and then deformed and cooled in a cold mold. Depending on the degree of deforming, the absorber, which may also have supporting properties for the component, is partially thinned and thus weakened. In order to achieve the required mechanical properties in such deformed regions, the non-deformed or little deformed regions are oversized. Thus, the component has a higher weight than would be necessary for strength.

Acoustically open floor covers (carpets) include, starting from the visible surface, for example, needle-punched, dilours or tufting carpets with fiber bonding. In order to achieve the necessary stiffness, an absorber or compressed mixed fiber web is mostly firmly connected with the carpet. The carpet and the absorber or the compressed mixed fiber web are deformed on a deformation device, and subsequently trimmed. The absorber and the insulation are produced separately.

Foam absorbers or insulations are an exception; they are essentially foamed onto the carpet, which naturally leads to an acoustically closed carpet, which does not correspond to the object of being highly absorptive and flow-open.

Components from a fiber-filling or airlay technology as well as card-laid non-wovens of pure PET or mixed fibers are known as open absorbers or insulations. The non-woven insulations include non-deformed (planar), (pre)deformed blanks as well as insulations prepared by the fiber-flock method, in particular.

The blanks themselves can be deformed, or bonded onto the carpet as segments. A disadvantage of all these methods is the high demand for devices and the necessary process steps associated therewith.

Such floor lining systems are described, for example, in DE 10 2004 046 201 A1, DE 103 60 427 A1, DE 199 60 945 A1 and DE 10 2007 036 952 A1.

SUMMARY OF THE INVENTION

A method for producing at least two-layer components as an absorptive lining in the interior and/or trunk or for floor coverings of motor vehicles, comprising a top material and an absorber, characterized in that:
(a) an absorber material molded on one side in a flock box is introduced into a steam/vacuum mold;
(b) the top material cut into blanks is introduced into the mold with its flow-closed side facing towards the material of the absorber, which contains a binder, according to step (a);
(c) the mold is closed;
(d) by applying steam from the lower side of the bottom material, the top material is deformed, the binder in the bottom material is activated, and the top and bottom materials are bonded to one another;
(e) the steam pressure is reduced by a lower pressure on the upper side as compared to the pressure on the lower side of the bottom material; and
(f) the component is subsequently cooled in a calibrating mold or deposit tray.

DESCRIPTION OF THE PREFERRED EMBODIMENTS

The present invention is based on the object of bonding a top material having a flow-tight closed backside to an absorber or insulation without previously producing blanks of the absorber or of the insulation, by producing the absorber or the insulation by flocking absorber material in a mold, whereby material accumulations defined through the component can be produced, a defined thickness and thus a defined stiffness/strength and defined acoustic properties are achieved by compressing in a mold with defined cavity distance distributions; wherein the flocked absorber material is molded (compressed) with the top material into the final contour in one step, and the top material is itself bonded and simultaneously the top material is bonded with the absorber or the insulation.

In a first embodiment, the above mentioned object is achieved by a method for producing at least two-layer components as an absorptive lining in the interior and/or trunk or for floor coverings of motor vehicles, comprising a top material and an absorber, characterized in that:
(a) an absorber material molded on one side in a flock box is introduced into a steam/vacuum mold;
(b) the top material cut into blanks is introduced into the mold with its flow-closed side facing towards the material of the absorber, which contains a binder, according to step (a);
(c) the mold is closed;
(d) by applying steam from the lower side of the bottom material (absorber), the top material is deformed, the binder in the bottom material (absorber) is activated, and the top and bottom materials (absorber) are bonded to one another;

(e) the steam pressure is reduced by a lower pressure on the upper side as compared to the pressure on the lower side of the bottom material (absorber); and (f) the component is subsequently cooled in a calibrating mold or deposit tray.

Depending on the component, different producing steps can be saved as compared to methods known in the prior art.

For example, in a side lining for a trunk of a motor vehicle with a textile absorber (the insulation being compressed into the absorber), the whole process of blank production can be omitted.

With the production technology according to the invention, it is possible to introduce absorber material in a defined way where it is necessary according to requirements.

Thus, with the same structure, up to 20% by weight of material can be saved as compared to the blank deformation of an insulation, because in places where no material is necessary, the latter can be omitted.

The fact that the flock box is filled with the absorber material almost precisely according to the final contour reduces the waste again by more than 10% by weight as compared to blank deformation. By suction methods (fiber flocking technology in a suction process), material combinations with different thicknesses can be realized, which is not possible in conventional production.

With a layer-wise construction from different materials by the fiber flocking technology, a coupling of mechanical and acoustic properties can be realized.

The material from which the absorber or the insulation is formed includes, in particular, a thermoplastic binder in the form of fibers (PP, PET-BiCo, PE and other per se known materials), and especially filler materials, such as expanded PP (EPP), expanded PS (EPS), plastic fibers, natural fibers, filler materials in pieces of plastic (PUR chips) or natural materials (e.g., cork granules). All binders or filler materials can be present alone or in different mixtures.

The binder is usually mixed homogeneously with the filler material and transported to the contoured, air-permeable preform mold (flock box) using an air flow. The mixture is laid onto the flock box in accordance with the requirements for contour and thickness.

The thus preformed absorber material or insulation material is usually placed into a mold by means of a robot. Above the preformed absorber material or insulation material, a top material with a steam vacuum flow tight closed backside, for example, a decorative material correspondingly cut into a blank shape, is supplied, especially in a tenter device. The tenter device is preferably provided outside the mold, or mounted on the outside thereof, and does not hamper the closing of the mold.

In specific components/material structures, the top material has no flow-tight closed backside, but a flow-open backside with a high flow resistance. Microperforated plastic sheets as well as non-wovens with a high flow resistance are employed, for example.

In a particular embodiment, the tenter device has individual or several moveable clamps, by which the top material can be purposefully released into the mold in a tensioned or relaxed state.

When the mold is closed, the top material and the absorber or insulation are brought into their final shape. In accordance with the selectively locally accumulated amount of material and the required thickness, different densities and thus different mechanical and acoustic properties of the absorber or insulation are formed.

The top material preferably includes a flat needle felt, dilours, velours, including their intermediates, a woven fabric, knitted fabric, or a plastic sheet. The top material may optionally be provided with a mixed fiber web on the cover side and/or bottom side thereof. Further, a needle-punched recycling sandwich web with the following characteristics could also be employed:

100 to 250 g/m$^2$ mixed fiber web (PET/PP or PP/coPET);

350 to 800 g/m$^2$ recycled granules (PET, grain size 1 to 4 mm)

100 to 250 g/m$^2$ mixed fiber web (PET/PP or PP/coPET).

In a particular modification of the method, an expanded binder (e.g., EPP) without a further filler is preformed and thermally treated as described above.

The mold is characterized, in particular, in that the material required for the part is tightly enclosed in the cavity by positive locking.

In at least one half of the mold, especially in the region of the bottom side of the absorber or insulation, there is a bore system through which steam can be passed into the cavity and out again.

Both mold halves are heated by a suitable heating system to the same or different temperatures. At first, a major part of the enclosed air is sucked away by means of a vacuum applied through the bore system. Subsequently, the enclosed material is heated by means of steam. Finally, most of the steam is sucked away from the cavity, and the part inside is cooled down thereby.

In the following, the invention is further illustrated by means of an Example.

The absorber material or insulation material consisting of a mixture of BiCo, PET and cotton fibers as well as PUR foam flocks was flocked in a flock box by a suction method by means of fiber flocking technology.

Subsequently, the preformed absorber or insulation material was removed by means of a gripper and placed into a steam/vacuum mold.

The top material, a 540 g/m$^2$ PET dilours carpet with 20% by weight BiCo fraction and a backside 90 μm PE/PA/PE sheet, was introduced into an open steam/vacuum mold by means of a tenter, and placed onto the absorber or insulation material.

In this embodiment, the sheet was not connected with the top material. The top material was heated in a radiator heating field, and the sheet as well as the top material were inserted (manually in this case) into the steam/vacuum mold.

In practice, the top material, which optionally contains a (mixed fiber or recycling sandwich) web as a support on the backside thereof, is previously laminated with the sheet, or an extrusion layer is applied.

Subsequently, the mold was closed; the upper half of the mold was at room temperature, while the lower one, to which a vacuum could be applied, was heated at 120° C.

In this Example, no vacuum was drawn on the top material.

As soon as the mold was closed, a vacuum was drawn through the lower half of the mold for about 3 seconds, followed by application of steam for about 15 seconds, and subsequently, a vacuum was drawn again for about 3 seconds.

After a cycle time of about 40 seconds, including the closing and opening of the mold, the molding process was complete, and the top material was tightly bonded to the absorber or insulation.

The finished component was now placed onto the cooling tray.

The invention claimed is:

1. A method for producing at least two-layer components as an absorptive lining in the interior and/or trunk or for floor coverings of motor vehicles, comprising a top material and an absorber, characterized in that:
    (a) an absorber material molded on one side in a flock box is introduced into a steam/vacuum mold;
    (b) the top material cut into blanks is introduced into the mold with its flow-closed side facing towards the material of the absorber, which contains a binder, according to step (a);
    (c) the mold is closed;
    (d) by applying steam from the lower side of the bottom material, the top material is deformed, the binder in the bottom material is activated, and the top and bottom materials are bonded to one another;
    (e) the steam pressure is reduced by a lower pressure on the upper side as compared to the pressure on the lower side of the bottom material; and
    (f) the component is subsequently cooled in a calibrating mold or deposit tray.

2. The method according to claim 1, characterized in that said top material is in a cold or heated state when introduced into said mold.

3. The method according to claim 1, characterized in that said introducing of the top material into the mold is effected by means of a tenter device that is provided outside the mold.

4. The method according to claim 1, characterized in that a textile top material is employed, optionally with a mixed fiber web or a recycling sandwich web.

\* \* \* \* \*

UNITED STATES PATENT AND TRADEMARK OFFICE
CERTIFICATE OF CORRECTION

PATENT NO. : 9,975,283 B2
APPLICATION NO. : 14/442878
DATED : May 22, 2018
INVENTOR(S) : Nicolai et al.

Page 1 of 1

It is certified that error appears in the above-identified patent and that said Letters Patent is hereby corrected as shown below:

On the Title Page

Column 1, item (30) Foreign Application Priority Data Change:
"Nov. 30, 2012 (DE)...................10 2012 222 000"
To:
Nov. 30, 2012 (DE)...................10 2012 222 000.3

Signed and Sealed this
Twenty-first Day of August, 2018

Andrei Iancu
*Director of the United States Patent and Trademark Office*